US008776024B2

(12) United States Patent
Cabillic et al.

(10) Patent No.: US 8,776,024 B2
(45) Date of Patent: Jul. 8, 2014

(54) SOFTWARE APPLICATION FINE-TUNING METHOD, SYSTEM, AND CORRESPONDING COMPUTER PROGRAM PRODUCT

(75) Inventors: Gilbert Cabillic, Brece (FR); Jean-Philippe Lesot, Argentre du Plessis (FR)

(73) Assignee: Google Inc., Mountain View, CA (US)

( * ) Notice: Subject to any disclaimer, the term of this patent is extended or adjusted under 35 U.S.C. 154(b) by 153 days.

(21) Appl. No.: 13/513,452

(22) PCT Filed: Dec. 3, 2010

(86) PCT No.: PCT/EP2010/068892
§ 371 (c)(1),
(2), (4) Date: Aug. 2, 2012

(87) PCT Pub. No.: WO2011/067398
PCT Pub. Date: Jun. 9, 2011

(65) Prior Publication Data
US 2012/0304154 A1   Nov. 29, 2012

(30) Foreign Application Priority Data

Dec. 3, 2009 (FR) ...................................... 09 58607

(51) Int. Cl.
G06F 9/44 (2006.01)
G06F 9/45 (2006.01)

(52) U.S. Cl.
USPC ............ 717/124; 717/126; 717/127; 717/146

(58) Field of Classification Search
None
See application file for complete search history.

(56) References Cited

U.S. PATENT DOCUMENTS 5,355,487 A * 10/1994 Keller et al. .................. 717/127
6,014,516 A * 1/2000 Nishiumi ...................... 717/154
(Continued)

FOREIGN PATENT DOCUMENTS

EP   0 476 667 A2   3/1992
JP   2005 174045 A  6/2005

OTHER PUBLICATIONS

Fahringer T. et al., "Debugging Real-World Data-Parallel Programs with SPiDER" Future Generations Computer Systems, Elsevier Science Publishers, Amsterdam, NL LNKD-DOI:10.1016/S0167-7399X(02)00050-X, vol. 18, No. 6, May 1, 2002, pp. 779-788, XP004358278.

(Continued)

Primary Examiner — Isaac Tecklu
(74) Attorney, Agent, or Firm — McDonnell Boehnen Hulbert & Berghoff LLP

(57) ABSTRACT

The invention relates to a method for fine-tuning a software application that is written in a source programming language and is executable on a target platform. According to the invention, such a method includes: a stage of compiling said software application that is written in said source language and supplies the code of an intermediate software application that is written in an intermediate language, said stage comprising a step of inserting, into the code of said intermediate software application, a specific construction for intercepting events by means of complementary instructions, and a step of formatting the intermediate code of said software application such that the matching of a line of source code with a line of intermediate code is the most frequent possible matching; a stage of compiling the code from said intermediate software application into an executable software application; and a stage for fine-tuning said software application, said stage including at least one step of converting at least one piece of fine-tuning information between a program for fine-tuning said intermediate language and a program for fine-tuning said source language.

20 Claims, 2 Drawing Sheets

(56) References Cited

U.S. PATENT DOCUMENTS

Figure 1:
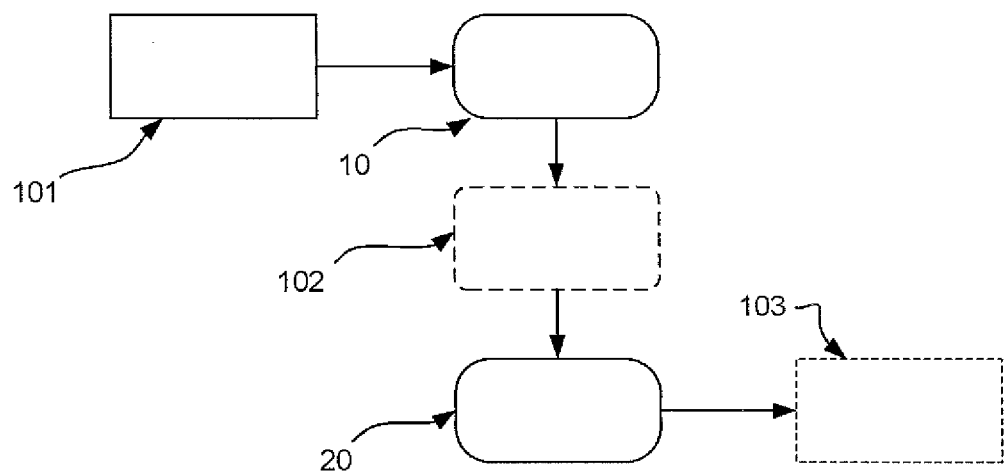

| | | | |
|---|---|---|---|
| 6,063,133 A * | 5/2000 | Li et al. | 717/136 |
| 6,085,029 A * | 7/2000 | Kolawa et al. | 714/38.13 |
| 6,282,702 B1 * | 8/2001 | Ungar | 717/148 |
| 7,721,196 B2 * | 5/2010 | Tilford et al. | 715/236 |
| 2002/0095660 A1 * | 7/2002 | O'Brien et al. | 717/127 |
| 2002/0116699 A1 * | 8/2002 | Amrhein et al. | 717/100 |
| 2003/0126590 A1 * | 7/2003 | Burrows et al. | 717/154 |
| 2006/0200796 A1 * | 9/2006 | Ota et al. | 717/106 |
| 2008/0301649 A1 * | 12/2008 | Stall | 717/134 |
| 2008/0320457 A1 * | 12/2008 | King et al. | 717/146 |
| 2009/0178031 A1 * | 7/2009 | Zhao | 717/143 |
| 2010/0162212 A1 | 6/2010 | Stall et al. | |

OTHER PUBLICATIONS

Kumar N. et al., "Transparent Debugging of Dynamically Optimized Code", 1009 7th Annual IEEE/ACM International Symposium on Code Generation and Optimization (CGO 2009) IEEE Piscataway, NJ, USA, Mar. 2009, pp. 275-286, XP002594296.

Hui Wu et al., "Grammar-Driven Generation of Domain-Specific Language Debuggers", Software: Practice and Experience John Wiley & Sons Ltd. UK, vol. 38, No. 10, Aug. 2008, pp. 1073-1103, XP002594295.

International Preliminary Report on Patentability and English translation of the Written Opinion dated Jul. 4, 2012 for corresponding International Application No. PCT/EP2010/068892, filed Dec. 3, 2010.

International Search Report for PCT Application No. PCT/EP2010/068892, dated Jan. 14, 2011, 8 pages.

* cited by examiner

SOFTWARE APPLICATION FINE-TUNING METHOD, SYSTEM, AND CORRESPONDING COMPUTER PROGRAM PRODUCT

CROSS-REFERENCE TO RELATED APPLICATIONS

This Application is a Section 371 National Stage Application of International Application No. PCT/EP2010/068892, filed Dec. 3, 2010, which is incorporated by reference in its entirety and published as WO 2011/067398 A1 on Jun. 9, 2011, not in English.

1 FIELD OF THE INVENTION

The present invention pertains to the field of the debugging of software programs or applications.

The present invention pertains more particularly to the debugging of software programs or applications in heterogenous environments.

A data-processing or computer program or software application generally consists of a set of binary or intermediate instructions known as executable instructions. These executable instructions are usually derived from a compilation of a program written in a source language. Thus, to enable the creation of a software application, a developer draws up a source program written in a specific programming language. This source program is then compiled in order to form an executable program. During this compilation, the instructions written in the source language are converted into a binary program which is itself executed on a hardware platform such as a computer, or a communications terminal.

To compile a program written in a source language for a certain target (processor, platform etc), there are four general methods:
  having available a full compiler, i.e. a compiler comprising a part takes charge of recognizing the source language and another that takes charge of creating the executable program for the chosen target. This is the general case;
  having available a compiler of the source language into an intermediate code, and providing a virtual machine with this intermediate code on the chosen target. This is the general case for the Java™ language for example;
  providing a compiler, already existing for the chosen target, with a complementary module to recognize the source language;
  have available a compiler which converts a program written in a source language into a program written in an intermediate language, and implementing an existing compiler of the intermediate language for the chosen target.

Thus, apart from the above general case, there are more complex procedures in which the source program undergoes a succession of compilations: the source program is for example compiled for a first time into an intermediate language in order to provide an intermediate program and then the intermediate program is compiled into a binary format to deliver the final binary application. An example of this kind occurs when the developer drafting the source program wants the final software application to be executed on a particular hardware platform or wants the final software application to have execution performance characteristics higher than those that would be delivered in compiling the source program with a traditional compiler. The successive compilations are also used when the developer does not wish to change programming platforms despite the fact that the platform on which the final software application has to be executed does not have any compiler available to compile a program written in a given source language.

2 PRIOR-ART SOLUTIONS

Thus, when a developer wishes to create a software application that will undergo a succession of compilations (i.e. at least two compilations) prior to the completion of a binary computer program, he looks into problem of the debugging or finalizing of the application.

Referring to FIG. 1, we present the general principle of the successive compilations of an application. A source software application (101) is drafted by an application developer. This source program comprises computer program instructions written in a source programming language. The source program (101) undergoes a first phase of compilation by a compiler (10) which culminates in its conversion into an intermediate program (102). This intermediate program (102) is written in an intermediate programming language. For example, the source program may be written in the Java™ language while the intermediate program resulting from the first compilation phase may be written in the C++ or C language.

If an appropriate compiler exists, the intermediate program (102) also undergoes a phase of compilation using a compiler (20) during which it is converted into an executable program (103). In other examples, several successive compilation phases can be performed in different intermediate programming languages in order to provide an executable program which meets the requirements of the target platform on which it has to be executed.

During such successive compilation programs, the inventors have noted that it is extremely complicated to debug a software application. Indeed, classically, a software application contains numerous anomalies (or bugs). These anomalies are generally identified and corrected during a phase of unit tests and then during a phase known as an acceptance phase.

To make these corrections, the developers are assisted by a debugging program also known as a "debugger". A debugger is a program which, linked with the compiler, enables execution of the software application written in the source language. The source software application to be debugged is executed through the debugger and is executed normally. The debugger then offers the developer the possibility of controlling the execution of the software application, in enabling him by various means to stop, i.e. put on hold the execution of the software application or again observe for example the content of the different variables in memory. The state of execution can then be observed in order, for example, to determine a cause of a failure.

The debuggers work accurately when a single compilation step is needed to convert a software application written in a source language into an executable software application.

Figure 2:
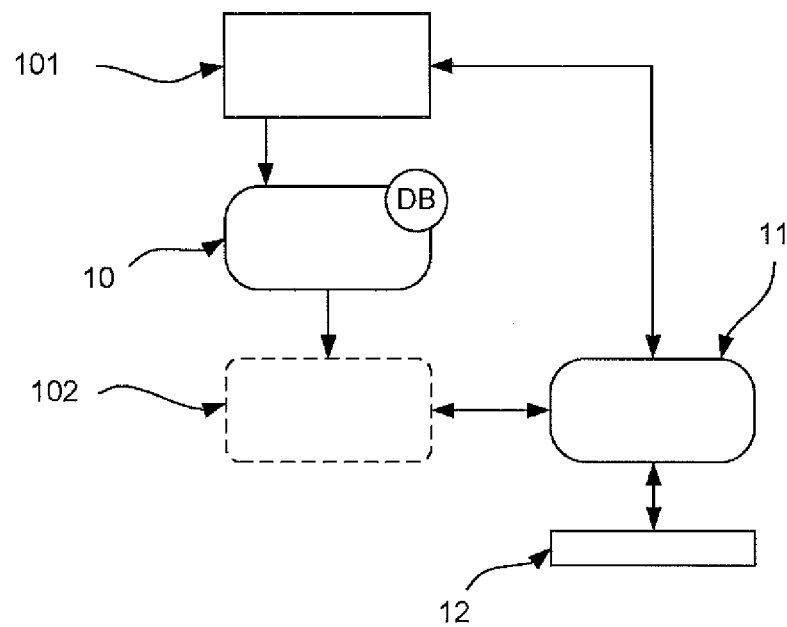

Referring to FIG. 2, we present the general principle of implementation of a debugger (11). The source program (101) is compiled according to one specific method (DB) by the compiler (10). This specific method is generally called "Debug Mode". The developer can then control the execution of the program compiled by the debugger (11) by viewing the various aspects of the program through a debugging interface of the debugger. To this end, the debugger uses the relationships between the instructions of the source program and the instructions of the compiled program that the compiler (10) has generated according to the specific method (DB).

One problem arises during the debugging of the applications that undergo several (at least two) successive compilations in at least one intermediate language. At present, when a program written in a language A is compiled into a program written in a language B, and then when the program written in the language B is compiled in its turn into binary form, the debugging is done by using a debugger dedicated to the language B and by using the intermediate program written in language B. To this end, the intermediate code has to be humanly readable to facilitate this task, which is far from being the case. Indeed, as a general rule, the compilers do not provide compiled programs designed to be read and understood by human beings. The programs compiled include many optimization operations which make them unreadable to most developers.

Furthermore, the fact of having to use a debugger for the intermediate language has at least the following two problems:

The developer of the program in the source language must also know the intermediate language to debug the binary code with the intermediate language debugger. He must then carry all the corrections made to the intermediate program into the program written in the source language and, to this end, understand how the compiler of the source language into the intermediate language works. This hugely reduces the attractiveness of such a solution.

The compiler of the source language into the intermediate language must, as far as possible, make the generation of its code into intermediate language humanly readable (with the same name, same construction etc). This is not always possible because the source language and the intermediate language may be semantically far too distant from each other to ensure this property. In any case, these constraints excessively influence the designing of the compiler and the optimizing that it may carry out.

Thus, the problems engendered by multiple compilations make it very difficult to use debuggers during the development of software applications requiring numerous intermediate compilations.

3 SUMMARY OF THE INVENTION

The invention provides especially a novel and inventive solution to these problems of the prior art.

Indeed, the invention proposes a method for debugging a software application written in a source programming language and executable on a target platform.

According to the invention, such a method comprises:
a phase for compiling said software application written in said source language delivering the code of an intermediate software application written in an intermediate language, said phase for compiling furthermore comprising:
  a step for inserting, within the code of said intermediate software application, a specific construction for intercepting events occurring during the execution of a debugging program for said intermediate language, by means of complementary instructions;
  a step for formatting the intermediate code of said software application so that the matching between a line of the source code and a line of the intermediate code is the most frequent matching possible;
a phase for compiling the code of said intermediate software application into a software application executable on said target platform,
a phase for debugging said software application comprising at least one step for converting at least one piece of debugging information between a debugging program for said intermediate language and a debugging program for said source language.

Thus, according to this aspect, the invention makes it possible to control a future process for debugging the intermediate program by means of instructions that are intended for the debugger of the intermediate program. These complementary instructions, which are not necessary as such for the process of compiling the program written in the intermediate programming language into the target platform, make it possible control the execution of the intermediate program when it is itself being debugged. These complementary instructions also make it possible to transmit the information needed for debugging the source program to a debugger of the source program.

Thus, the invention relies on a wholly novel and inventive approach to the debugging of software applications, the source language of which undergoes successive compilations. The invention makes it possible, on the one hand, not to have to learn the intermediate language or languages in which the source program is successively compiled. On the other hand, the invention makes it possible not to have to debug the application in an intermediate language to thereafter reintegrate the corrections made in the program written in source language.

According to one particular embodiment of the invention, said phase for compiling further comprises a step for generating at least one specific representation of said software application within an intermediate data structure and said phase for debugging implements said intermediate data structure.

Thus, the invention can be used to build a data structure that will be able to serve for debugging in indicating, in this intermediate data structure, the information that could be useful to the gateway debugger to improve or facilitate the debugging by means of the source language debugger.

According to one particular characteristic of the invention, said phase for debugging comprises:
  a step of reception, from said debugging program for said source language, of a request for obtaining at least one piece of data that does not depend on the execution of said software application, called a piece of static data;
  a step of searching for said at least one piece of static data in said intermediate data structure;
  a step for transmitting said at least one piece of static data to said debugging program for said source language.

Thus, the gateway debugger, which implements the method of the invention, can manage the static request that it implements coming from the debugging program for the source language.

According to one particular embodiment of the invention, said phase for debugging comprises:
  a step of reception, from said debugging program for said source language, of a request for obtaining at least one piece of data depending on the execution of said software application, called a dynamic piece of data;
  a step for converting said request for obtaining at least one piece of dynamic data into a request for obtaining at least one piece of dynamic data intended for said debugging program for said intermediate language, delivering a converted request;
  a step for transmitting said converted request to said debugging program for said intermediate language;
  a step for executing said converted request by means of said debugging program for said intermediate language delivering said at least one piece of dynamic data;

a step for transmitting said at least one piece of delivered dynamic data to said debugging program for said source language.

Thus, the gateway debugger which implements the method of the invention can manage the dynamic request that it intercepts coming from debugging program for the source language and ask the debugging program for the intermediate language to execute these requests on behalf of the debugging program for the source language.

According to one particular embodiment of the invention, said phase for debugging comprises:
- a step of reception, from said debugging program for said source language, of a request to control the execution of said software application;
- a step for converting said received request to control execution into an equivalent request to control execution intended for said debugging program for said intermediate language, delivering a converted request to control execution.
- a step for transmitting said request to control execution of said debugging program for said intermediate language.

Thus, the gateway debugger which implements the method of the invention can manage the execution flow control requests that it intercepts from the debugging program for the source language and ask the debugging program for the intermediate language to execute these requests on behalf of the debugging program for the source language.

According to one particular characteristic of the invention, said phase for debugging comprises:
- a step of reception, from said debugging program for said source language, of a request for managing events of said software application;
- a step for converting said received request for managing events into a request for control over the execution of at least one complementary instruction intended for said debugging program for said intermediate language, delivering a converted request for managing;
- a step for transmitting said converted request for managing to said debugging program for said intermediate language.

Thus, the gateway debugger which implements the method of the invention can manage the requests for managing events that it intercepts coming from the debugging program for the source language and can ask the debugging program for the intermediate language to execute these requests on behalf of the debugging program for the source language.

According to another aspect, the invention also pertains to a method for compiling a program written in a source programming language into an intermediate program written in an intermediate programming language, said intermediate program being itself intended for compilation to a target platform.

According to the invention, such a method for compiling is characterized in that it comprises a step for the inserting, within said intermediate program, of at least one complementary instruction for controlling said intermediate program by means of a gateway debugger.

Thus, the invention makes it possible to use the program written in the intermediate language, at the end of the compilation according to the compilation method of the invention, by means of a program for debugging in the intermediate language while enabling the control of this intermediate program by a gateway debugging program setting up an interface between the debugging program for the source language and the debugging program for the intermediate language.

According to another aspect, the invention pertains to a system for debugging a software application written in a source programming language and executable on a target platform. According to the invention, such a system comprises:
- means for compiling said software application written in said source language delivering the code of an intermediate software application written in an intermediate language, said means for compiling comprising:
    - means for inserting, within the code of said intermediate software application, a specific construction for intercepting events occurring during the execution of a debugging program for said intermediate language by means of complementary instructions;
    - means for formatting the intermediate code of said software application so that the matching between a line of the source code and a line of the intermediate code is the most frequent matching possible;
- means for compiling the code of said intermediate software application into a software application executable on said target platform
- means for debugging said software application comprising at least means for converting at least one piece of debugging information between a debugging program for said intermediate language and a debugging program for said source language.

The invention also pertains to a computer program comprising instructions for implementing the method for debugging described here above when this program is executed by a processor or a computer program product downloadable from a communications network and/or stored on a computer-readable medium and/or executable by a processor, comprising program code instructions to implement the above-described method for debugging when it is executed by a processor.

4 LIST OF FIGURES

Figure 3:
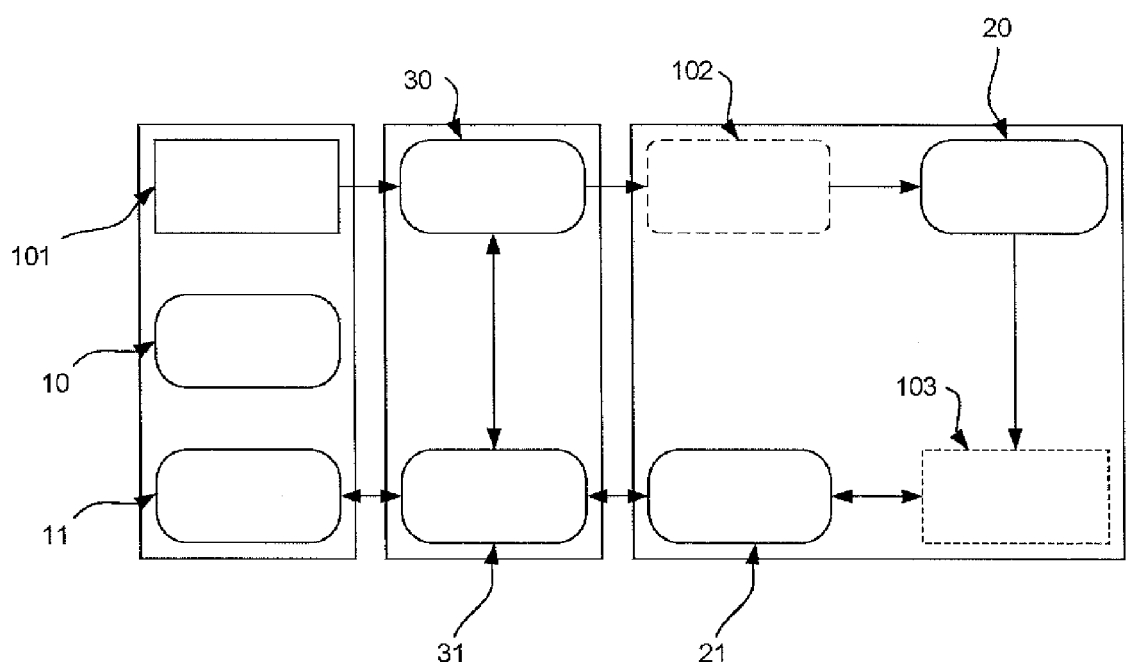

Other features and characteristics of the invention shall appear more clearly from the following description of a preferred embodiment given by way of a simple illustratory and non-exhaustive example and from the appended drawings, of which:

FIG. 1, already commented upon, presents the general principle of the successive compilation of a software application;

FIG. 2, also already commented upon, illustrates the working of a debugging program (debugger) of a software application;

FIG. 3 describes the principle of the invention.

5 DETAILED DESCRIPTION OF THE INVENTION

5.1 Reminder of the Principle of the Invention

The invention enables a debugging of the software application directly by means of the debugging program (debugger) for the source language. It is therefore not necessary when the invention is implemented to debug the software application by means of the intermediate language debugger. The invention provides for gaining time in debugging and facilitates the developer's debugging task. Indeed, on the one hand the developer does not need to know the intermediate programming language and, on the other hand, he does not need to carry over the modifications made in the intermediate program, in the intermediate programming language, into the program written in the source programming language.

The method for debugging is implemented in at least one embodiment of the invention by means of a gateway debugger, used to set up a dialog between the source language debugger and the intermediate language debugger. More particularly, the gateway debugger is a program or a software program that defines an interface between the debugger for the source language and the debugger for the destination language. The gateway debugger can also interact directly with the compiler of the destination language in order to obtain the evaluation, on behalf of the debugger for the source language or on behalf of another component, of an expression, for example a dynamic expression which is transmitted to it and, when this expression has been evaluated by the compiler by the destination language, it can reconvert the result of this expression into a result that is comprehensible to the source language debugger or the other component.

Those skilled in the art will understand, in reading the present application, that the principle of the invention can be applied successively. Thus, when implementing the invention, it is possible to debug a software application written in a source language even though several steps of compilation in successive intermediate languages would be needed before a final compilation into the target platform.

The general principle of the invention relies, inter alia and in part, on the insertion, during the compilation from the language source into the intermediate language of complementary instructions, whose purpose is to enable control of the debugging program (the debugger) for the intermediate language and to transmit the information needed to finalize the debugging program for the source language.

The invention proposes, so to speak, an interface between the different debugging programs, an interface that is made operable by means especially of the complementary instructions that are inserted during the compilation from the source language into the intermediate language.

The principle of the invention will be understood more clearly from FIG. 3 which presents the general principle of the invention. The numerical references common to FIGS. 1 and 2 have been preserved for greater clarity.

A software application 101 is redirected to a source programming language A. For the source programming language A, a compiler 10 and a debugging program 11 are available. This set is called the development environment of the language A.

A programming language B is also available. It can be used to write the software applications natively. For this language, the following are available: a programming language B, a compiler 20 and a debugging program 21. When there is a program available written by means of the programming language B, this set is called the development environment of the language B. According to the invention, the programming language B is called the intermediate programming language in the sense that it serves as an intermediary between the software application written in the source programming language A and the binary version of the software application for the target platform.

According to the invention, the following are also available:
 a gateway compiler 30 from the source language A into the language B;
 a gateway debugging program 31 setting up an interface between the debugging program 11 for the language A and the debugging program 21 for the language B.

According to the invention, this gateway debugging program 31 makes it possible to control the execution, for the debugging program 11 for the language A, of an executable is assumed to have been compiled by means of the compiler 10, whereas this is not the case. According to the invention, this gateway debugging program 31 enables the simulation, for the debugging program 21 for the language B, of the presence of a debugging data reception interface (which could be used for example by a graphic interface).

To achieve the debugging according to the invention, the gateway debugging program 31 receives pieces of compilation data from the compiler 30 of the source language A into the language B. These pieces of compilation data come on the one hand from complementary instructions which are inserted by the compiler 30 of the source language A into the language B, during the compilation of the software application. These pieces of compilation data come, on the other hand, from the data in the memory of the compiler or else from their writing to a file in a particular data structure, making it possible for example to respond to static and dynamic requests which could be sent out by the debugging program for the source language (language A).

Thus, during the phase for debugging proper, the gateway debugging program 31 uses these pieces of compilation data to intercept and translate incoming requests from the debugging program 11 for the language A (by using a communications protocol with this debugging program 11 for the language A). The incoming requests are of the classic type and may consist of static or dynamic requests or control flow type requests.

The gateway debugging program 31 converts these incoming requests so that they become comprehensible to the development environment of the language B. More particularly, depending on the type of incoming requests from the debugging program 11 for the language A, the gateway debugging program 31 can:
 directly or indirectly, by means of an appropriate file, interrogate the gateway compiler 30 from the language A into the language B in order to obtain a response;
 interrogate the debugging program 21 for the language B in order to evaluate a particular expression;
 obtain pieces of information on flow control with the debugging program 21 for the language B and convert these pieces of information so that they are comprehensible to the debugging program 11 for the language A.

Thus, using a gateway debugging program 31 and a gateway compiler 30 to debug the source software application written in language A provides several advantages:
 it is not necessary to provide a compiler from the language A into the language B which must, as far as possible, keep the constructions of the language A or else the different names of the program written in language A. By removing these constraints, the compiler has greater latitude to compile and optimize the program;
 it is not necessary to write a debugging program for the languages A and B: it is enough to use the pre-existing ones;
 it is not necessary for the developer to learn or maintain qualifications and competence in language B;
 it is not necessary for the developer to learn a new compiler, he continues to use the one associated with the language A.

Here below, we present especially the case of a use of the intermediate language Objective-C™ and the source language Java™. It is clear however that the invention is not limited to this particular application but can also be implemented in numerous other examples, for example the Pascal language or language C and more generally in every case where the goals listed here below are worthwhile.

5.2 Description of One Embodiment

In this embodiment, we present the implementation of the invention in a gateway debugging program between the Eclipse debugger for Java™ and a GDB debugger for Objective-C™.

5.2.1 Initial Compiling Phase

According to the invention, prior to the debugging, the compiler in debug mode converts the source code of the software application written in the source programming language into the intermediate programming language by inserting complementary instructions. More particularly, the compiler from the source language into the intermediate language makes the following modifications:

- It formats the code so that each line in source language is converted to the utmost possible extent into a line of the intermediate language. This intermediate language debugging program to carry out a step over for the source language.
- If the compiler cannot maintain this above property (a line in language A on a line in language B), then it inserts compilation directives (i.e. "#line" for C stub compilers (Objective-C, C++, C, ... )). It will thus indicate that these different lines in intermediate language come from the same line in source language. For example, if the language A supports the initializing of a variable at the same time as its declaration and if the language B does not support this construction, then the compiler must shift the initializing of the variable in one or more initializing methods. In this case, it will insert compilation directives to indicate that these different initializations in language B come from the same line in language A, i.e. the place at which the declaration of this variable is located.
- The line name and number are used, in the method of the invention, not as a pointer to a real line of the source code but by the gateway debugging program as the unique line identifier. This line identifier will be kept according to the invention in the intermediate representation of the compiler so that the gateway debugging program can make the conversions needed during the debugging proper.
- It generates constructions unnecessary for the execution of the program so that the gateway debugger can insert breakpoints on certain events. For example, for the Exceptions Handling System (EHS), the debugger for the language A may need to know when an error is reported through an "exception" (the keyword is "throw" in certain languages). In this case, it replaces all occurrences of the keyword "throw" by invoking a particular method before really sending them (the exceptions). Thus, the gateway debugger is informed of all exceptions transmission of the program by inserting a breakpoint in this method. In general, it inserts a method invocation before each instruction that generates an event which the into an exception processing block, creation/destruction of an execution thread, introduction into a particular method, etc).

Thus, the software application written in intermediate language is specifically built to enable the generation of data which will thereafter be used by the gateway debugger. This is a major point of the invention. Constructions called "unnecessary" (unnecessary because they do not fulfill a specific function in the application) are actually very useful for the gateway builder.

5.2.2 Phase for Debugging

As already mentioned, the phase for debugging a software application comprises a plurality of steps for sending requests from the debugging program for the language concerned. More particularly, these request-sending steps are aimed at controlling the execution of the program and obtaining information on its state (content of the variables, methods executed, etc.).

According to the invention, the gateway debugger intercepts all the incoming requests from the debugger for the source language in the protocol of the debugger for the source language. To this end, according to the invention, it knows the protocol used and represents itself as the final debugger. It reacts in the same way, giving the graphic interface and the developer the same interactions as with the classic debugger.

5.2.2.1 Static Requests

For static type demands, i.e. demands that do not ask for data depending on the execution of the program such as the name of the classes, the methods, the fields:

- Either the gateway debugger finds the information in an information file written by the compiler (equivalent of debugging information in DWARF format for example);
- Or the gateway debugger directly interrogates the compiler which will search internally for the information needed to respond to the request;
- Or the gateway debugger directly uses the intermediate representation in the process of the compiler to find the necessary information.

In all three cases, the information provided by the compiler, on the basis of an intermediate data structure (internal or external to the compiler), contains all the structural information of the program. It is then possible to ask for all the classes, all the methods of instances or classes, fields of instances or classes, all the classes contained, etc. of a certain class to be found.

5.2.2.2 Dynamic Requests

For dynamic type requests, i.e. requests for data depending on the execution of the program, the gateway debugger:

- Expresses this request in an expression in language A, for example to know the value of a field f of the class C of the package xxx.yyy.zzz in the program Java, it builds an expression such as xxx.yyy.zzz.C.f and will apply the same conversions as the gateway compiler would have done on such an expression;
- Requests the debugger of the language B in its protocol to assess this expression. For example, with gdb-mi, it will send the command "-data-evaluate-expression xxx_yyy_zzz_C_f";
- Retrieves the value of the expressions and translates them into a value comprehensible in source language;
- Responds to the request.

In passing (transferring) the entire expression into the compiler, this leaves the compiler with total freedom to generate code in the target language. To illustrate this point, it is possible for example for the compiler to generate a management of the fields autonomously in memory (with a symbol+offset pair: xxx.yyy.zzz.C+0x10), without relying on the fields of the target language (with a symbol: xxx.yyy.zzz.C.f). Indeed, the other solutions of the prior art rely on a matching of symbols, which is not the case in the invention. This property of the invention is all the more important as the levels of the source language and of the target language are distant.

This solution furthermore has the advantage of making the compiler independent of the gateway debugger. Indeed, the gateway debugger does not have knowledge of the matching between the expression in the source language and the expression in the target language. It questions the compiler for this purpose.

5.2.2.3 Control Flow Requests

Several control flow requests can reach the gateway debugger:

The placing of a breakpoint. The request comprises a location of the breakpoint as a file name and line number in the file. The gateway debugger must retrieve the single line identifier which the compiler has inserted during the compilation phase in the form of a fictitious file name and line number. It must ask the compiler for this information, directly or indirectly through a file or will directly search for this information in the intermediate representation of the compiler. It will then ask that this breakpoint be placed in the debugging program for the intermediate language.

The 'step over', the 'step-into' . . . . Through the formatting of the source code in intermediate language preliminarily performed by the compiler, the gateway debugger only has to transmit the request in the protocol of the debugger of the intermediate language. If the conversion of the code of the source language into intermediate language does not enable this handling operation to be done or if the target debugger does not support the operation, an analysis of the control flow as described in the prior art makes it possible to find all the possible following instructions. The method then, according to the invention, comprises a step for inserting, through the above technique, breakpoints in all the following potential lines. It is then enough to continue the execution of the program to ensure that the next executed instruction will be properly stopped.

5.3 Other Optional Characteristics and Advantages

Here below, a debugging system according to the invention is described.

A system that implements the method of the invention comprises:

means for compiling the software application written in the source language A delivering the code of an intermediate software application written in the intermediate language B. These means for compiling take the form chiefly of an ad hoc compiler which can be executed on a computer. This compiler comprises, however, according to the invention:

means for inserting, within the code of the intermediate software application written in language B, a specific construction for intercepting events occurring during the execution of the debugging program for said intermediate language B by means of complementary instructions. These complementary instructions are used by the gateway debugger to enable the sending back of the information requested by the program for debugging the language A.

means for formatting the intermediate code of the software application so that the matching between a line of the source code and a line of the intermediate code is the most frequent matching possible. These formatting means act in order to ensure a construction of the intermediate program written in the language B that is as similar as possible to the original construction in language A.

means for compiling the code of said intermediate software application into a software application executable on said target platform. These means for compiling take the form chiefly of an ad hoc compiler which can be executed on a computer.

means for debugging the software application which, according to the invention, comprise means for converting at least one piece of debugging information between a program for debugging said intermediate language B and the program for debugging said source language A.

The invention claimed is:

1. A method for debugging a software application performed by a computing device, the method comprising:
   compiling a source code of the software application provided in a first language into an intermediate code provided in a second language different from the first language, wherein compiling the source code into the intermediate code comprises:
      inserting, within the intermediate code, complementary instructions that indicate (1) instructions for controlling an intermediate debugging program configured to debug the intermediate code and (2) instructions for translating debugging information between the intermediate debugging program and a source debugging program configured to debug the source code; and
      formatting the intermediate code such that a line of the source code points to at least one line of the intermediate code;
   compiling the intermediate code into an executable form; and
   debugging the source code, wherein debugging the source code comprises translating at least one piece of debugging information between the intermediate debugging program and the source debugging program according to the complementary instructions.

2. The method of claim 1, wherein compiling the source code into the intermediate code further comprises storing compilation data within an intermediate data structure, wherein the compilation data indicates structural information of the software application, and wherein debugging the source code further comprises utilizing the intermediate data structure.

3. The method of claim 2, wherein debugging the source code further comprises:
   receiving from the source debugging program a request for obtaining at least one piece of static data, wherein the at least one piece of static data does not depend on the execution of the software application;
   searching for the at least one piece of static data in the intermediate data structure; and
   transmitting the at least one piece of static data to the source debugging program.

4. The method of claim 1, wherein debugging the source code further comprises:
   receiving from the source debugging program a request for obtaining at least one piece of dynamic data, wherein the request is in the first language, and wherein the at least one piece of dynamic data depends on the execution of the software application;
   translating the request into the second language according to the complementary instructions;
   transmitting the translated request to the intermediate debugging program;
   receiving from the intermediate debugging program the at least one piece of dynamic data, wherein the at least one piece of dynamic data is in the second language;
   translating the at least one piece of dynamic data into the first language according to the complementary instructions; and transmitting the translated at least one piece of dynamic data to the source debugging program.

5. The method of claim 1, wherein debugging the source code further comprises:
receiving from the source debugging program a request to control execution of the executable form of the intermediate code, wherein the request is in the first language;
translating the received request into the second language according to the complementary instructions; and
transmitting the translated request to the intermediate debugging program to control execution of the executable form of the intermediate code.

6. The method of claim 1, wherein debugging the source code further comprises:
receiving from the source debugging program a request for managing debugging events, wherein the request is in the first language;
translating the received request into the second language according to the complementary instructions; and
transmitting the translated request to the intermediate debugging program.

7. A computing system for debugging a software application, the computing system comprising:
a processor;
a non-transitory computer-readable medium including instructions stored therein and executable by the processor to cause the computing system to perform functions comprising:
compiling a source code of the software application provided in a first language into an intermediate code provided in a second language different from the first language, wherein compiling the source code into the intermediate code comprise:
inserting, within the intermediate code complementary instructions that indicate (1) instructions for controlling an intermediate debugging program configured to debug the intermediate code and (2) instructions for translating debugging information between the intermediate debugging program and a source debugging program configured to debug the source code; and
formatting the intermediate code such that a line of the source code points to at least one line of the intermediate code;
compiling the intermediate code into an executable form; and
debugging the source code, wherein debugging the source code comprises translating at least one piece of debugging information between the intermediate debugging program and the source debugging program according to the complementary instructions.

8. A non-transitory computer-readable medium having stored therein instructions executable by a computing device to cause the computing device to perform functions comprising:
compiling a source code of a software application provided in a first language into an intermediate code provided in a second language different from the first language, wherein compiling the source code into the intermediate code comprises:
inserting, within the intermediate code, complementary instructions that indicate (1) instructions for controlling an intermediate debugging program configured to debug the intermediate code and (2) instructions for translating debugging information between the intermediate debugging program and a source debugging program configured to debug the source code; and
formatting the intermediate code such that a line of the source code points to at least one line of the intermediate code;
compiling the intermediate code into an executable form; and
debugging the source code, wherein debugging the source code comprises translating at least one piece of debugging information between the intermediate debugging program and the source debugging program according to the complementary instructions.

9. The non-transitory computer-readable medium of claim 8, wherein compiling the source code into the intermediate code further comprises storing compilation data within an intermediate data structure, wherein the compilation data indicates structural information of the software application, and wherein debugging the source code further comprises utilizing the intermediate data structure.

10. The non-transitory computer-readable medium of claim 9, wherein debugging the source code further comprises:
receiving from the source debugging program a request for obtaining at least one piece of static data, wherein the at least one piece of static data does not depend on the execution of the software application; and
searching for the at least one piece of static data in the intermediate data structure.

11. The non-transitory computer-readable medium of claim 10, wherein debugging the source code further comprises, in response to locating the at least one piece of static data, transmitting the at least one piece of static data to the source debugging program.

12. The non-transitory computer-readable medium of claim 8, wherein debugging the source code further comprises:
receiving from the source debugging program a request for obtaining at least one piece of dynamic data, wherein the request is in the first language, and wherein the at least one piece of dynamic data depends on the execution of the software application;
translating the received request into the second language according to the complementary instructions; and
transmitting the translated request to the intermediate debugging program.

13. The non-transitory computer-readable medium of claim 12, wherein debugging the source code further comprises:
receiving from the intermediate debugging program the at least one piece of dynamic data, wherein the at least one piece of dynamic data is in the second language;
translating the at least one piece of dynamic data into the first language according to the complementary instructions; and
transmitting the translated at least one piece of dynamic data to the source debugging program.

14. The non-transitory computer-readable medium of claim 8, wherein debugging the source code further comprises:
receiving from the source debugging program a request to control execution of the executable form of the intermediate code, wherein the request is in the first language;
translating the received request into the second language according to the complementary instructions; and
transmitting the translated request to the intermediate debugging program to control execution of the executable form of the intermediate code.

15. The non-transitory computer-readable medium of claim 8, wherein debugging the source code further comprises:
- receiving from the source debugging program a request for managing debugging events, wherein the request is in the first language;
- translating the received request into the second language according to the complementary instructions; and
- transmitting the translated request to the intermediate debugging program.

16. The non-transitory computer-readable medium of claim 8, wherein compiling the intermediate code into the executable form comprises converting the intermediate code into a binary program.

17. The non-transitory computer-readable medium of claim 8, further comprising instructions executable by the computing device to cause the computing device to perform functions comprising:
- before debugging the source code, receiving the at least one piece of debugging information from the source debugging program.

18. The non-transitory computer-readable medium of claim 17, wherein translating the at least one piece of debugging information between the intermediate debugging program and the source debugging program involves translating the received debugging information into the second language according to the complementary instructions.

19. The non-transitory computer-readable medium of claim 8, further comprising instructions executable by the computing device to cause the computing device to perform functions comprising:
- before debugging the source code, receiving the at least one piece of debugging information from the intermediate debugging program.

20. The non-transitory computer-readable medium of claim 19, wherein translating the at least one piece of debugging information between the intermediate debugging program and the source debugging program involves translating the received debugging information into the first language according to the complementary instructions.

* * * * *